United States Patent [19]

Borth et al.

[11] Patent Number: 5,574,973
[45] Date of Patent: Nov. 12, 1996

[54] METHOD OF REGISTERING/-REASSIGNING A CALL IN A DUAL MODE COMMUNICATION NETWORK

[75] Inventors: David E. Borth, Palatine; John R. Haug, Arlington Heights; Phillip D. Rasky, Buffalo Grove, all of Ill.

[73] Assignee: Motorola, Inc., Schaumburg, Ill.

[21] Appl. No.: 405,572

[22] Filed: Mar. 16, 1995

Related U.S. Application Data

[63] Continuation of Ser. No. 957,122, Oct. 7, 1992, abandoned.

[51] Int. Cl.$^6$ ..................................................... H04Q 7/22
[52] U.S. Cl. ...................... 455/33.1; 455/34.1; 455/54.2; 379/59
[58] Field of Search ................................ 455/33.1, 33.2, 455/33.4, 34.1, 34.2, 54.1, 56.1; 379/59, 60

[56] References Cited

U.S. PATENT DOCUMENTS

| | | | |
|---|---|---|---|
| 4,475,010 | 10/1984 | Huensch et al. | 455/33.3 |
| 4,670,899 | 6/1987 | Brody et al. | 455/33.4 |
| 4,670,905 | 6/1987 | Sandvos et al. | 455/33.4 |
| 4,670,906 | 6/1987 | Thro | 455/56.1 |
| 4,737,978 | 7/1988 | Burke et al. | 455/33.2 |
| 5,212,684 | 5/1993 | MacNamee et al. | 455/33.1 |
| 5,261,117 | 11/1993 | Ocson | 455/34.1 |
| 5,278,991 | 1/1994 | Ramsdale et al. | 455/33.2 |
| 5,381,443 | 1/1995 | Borth et al. | 455/33.1 |
| 5,396,,653 | 3/1995 | Kivari et al. | 455/33.1 |
| 5,504,803 | 4/1996 | Yamada et al. | 455/33.1 |
| 5,517,553 | 5/1996 | Sato | 379/59 |

Primary Examiner—Edward F. Urban
Attorney, Agent, or Firm—Anthony G. Sitko; Jeffrey G. Toler

[57] ABSTRACT

Registration operates by sensing (106) the availability of a first communication system. A quality factor of a channel of the system is measured (111). A channel of the first system is selected if the quality factor of the channel exceeds a threshold (113). If selected, the subscriber attempts to register the call (114). If the registration fails, the availability of a second communication system is sensed (107). A quality factor of a channel of the second system is measured (111) and selected (113), if the quality factor exceeds a threshold. The subscriber will then attempt to register (114) with the second system. Reassignment operates by determining if the first system has reached a capacity limit (126). If it has, it determines if a channel on the second system is available (128). If available, a transfer of the call from the first to the second system will be attempted (132).

17 Claims, 5 Drawing Sheets

METHOD OF REGISTERING/-REASSIGNING A CALL IN A DUAL MODE COMMUNICATION NETWORK

This is a continuation of application Ser. No. 07/957,122, filed Oct. 7, 1992 and now abandoned.

RELATED INVENTIONS

The present invention is related to the following invention which is assigned to the assignee of the present invention:

Dual Mode Communication Network, invented by Morton Stern et al., having U.S. Ser. No. 906,785, and filed on Jun. 30, 1992; and Method and Apparatus for Frequency Hopping a Signalling Channel in a Communications System, invented by Borth et al., having U.S. Ser. No. 07/955,793 and filed on Oct. 2, 1992, now U.S. Pat. No. 5,381,433.

FIELD OF THE INVENTION

The present invention relates, in general, to communication systems and, more particularly, to a method of registering/reassigning a call in a dual mode communication network.

BACKGROUND OF THE INVENTION

In current cellular communication systems, pedestrian users will access the mobile cellular network. This mobile cellular network provides continual overhead measurements used by the system to maintain channel quality or perform hand-off functions. Since these measurements require the same amount of processing whether the user is mobile or not, a pedestrian user is charged the same fee for using their phone as the user who is mobile.

Therefore, there exists a need in the industry for a personal communication system (PCS) which would provide a low tier system for pedestrian users at a reduced cost. The low tier system would provide access via radio frequency (RF) link to a basic cellular network which may or may not provide hand-off capability. For purposes of this discussion, a pedestrian user is one who roams slowly (10 kph, kilometers per hour, or less) as opposed to a mobile (up to 100 kph or more) user.

In order to avoid the necessity of having two separate subscriber units (handsets), it is desirable to provide a dual mode network in which only one subscriber unit is required, such as the network described in the *DUAL MODE COMMUNICATION NETWORK* patent application, incorporated herein by reference, described above.

Once such a network is established, there exists a need to provide a method of selecting which system in the dual network will be used to originate a call. Along the same lines, it will also be desirable to transfer an existing call between the two systems in the dual mode network. Such as, for example, in situations where a user is currently conducting a call while driving in a car. This call would normally be connected in the high tier, more expensive system. When the user stops the car, it would be desirable to have the call transferred to the low tier, more economical system.

SUMMARY OF THE INVENTION

In one embodiment of the present invention, a method of registering a call in a dual mode communication network having first and second communication systems is provided.

The method operates by first sensing the availability of the first communication system at power-up of a subscriber unit. A quality factor of a channel of the first communication system is then measured. The first communication system channel is then selected if the quality factor of that channel exceeds a threshold of the first communication system. If selected, the subscriber attempts to register the call with the first communication system on that channel. If the attempted registration of the call on the first communication system fails, the availability of the second communication system is sensed. If the second communication system is available, a quality factor of a channel of the second communication system is measured. If the the quality factor of that channel exceeds a threshold of the second communication system then the subscriber will attempt to register the call with the second system on that channel.

In another embodiment of the present invention, a method of reassigning a call, within a coverage area, from a first mode of a first communication system to a second mode of a second communication system in a dual mode communication network is provided. It is first determined if the first communication system has reached a capacity limit within the coverage area. If it has, it is determined if a channel on the second communication system is available. If the channel on the second communication system is determined to be available, a transfer of the call from the first communication system to the second communication system will be attempted.

DETAILED DESCRIPTION OF THE DRAWINGS

Figure 1:
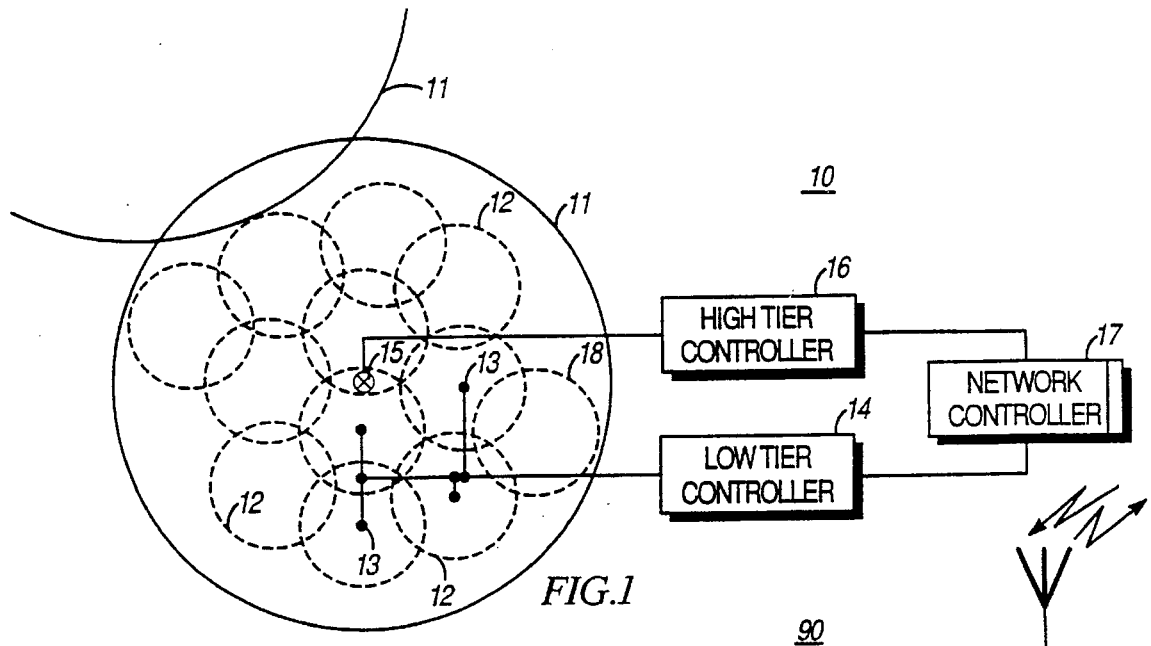
FIG. 1 is a block diagram representing a cell structure for a communication system embodying the present invention.

Referring initially to FIG. 1, a block diagram of a cell structure, generally designated 10, of a communication system embodying the present invention is illustrated. Cell structure 10 consists of a plurality of low tier cells 12, each having a base site 13, grouped in some form of traffic channel reuse pattern (21 cell, 7 cell, etc.). For purposes of this description, the term low tier denotes a communication system which, in exchange for reduced operating cost, provides a low delay performance, shorter range, and lower speed hand-off as compared to present day cellular systems. In addition to the low tier pedestrian portion of the system, there is a need to have the mobile cellular system function as a high tier portion of the PCS. For purposes of this description, the term high tier denotes a communication system which provides at least the same type of performance, range and hand-off capability as present day cellular systems. This high tier system is represented by cells 11, having a base site 15, which, in this preferred embodiment, are in a single cell reuse pattern. The high and low tier systems function together to provide a transparent single service to the user. The low tier system being controlled by a low tier controller 14 and the high tier by controller 16. Optionally, an overall network controller 17 is provided. Controller 17 may be comprised of portions of controllers 14 and 16.

An example of the operation of this type of network is a pedestrian user who is walking down a street using an RF telephone in the low tier system. The user then, during a call, enters a vehicle and drives off. The system must be able to determine that a change has occurred and transfer the call from the low tier system to the high tier system in a fashion transparent to the user.

As an alternative, the user may desire to control the mode of the subscriber unit. To accomplish this, a manual switch, or soft key, is provided on the subscriber unit for the user to change between high and low tier. In the scenario provided above, when the pedestrian enters the vehicle and drives off, the call would be discontinued by the low tier system once the user reached a speed beyond the capability of the low tier system.

In a further alternative, a reduced price subscriber unit can be provided which only has low tier capability. This type of unit would be used in pedestrian situations (e.g. home, work, shopping, etc.); but would not function with the high tier system. A cost saving would result from the ability to eliminate various components from the subscriber unit (such as forward error correction and interleaving).

However, in order to eliminate the need to carry multiple phones, or dual type phones, it is desirable to provide a dual mode system in which the high tier and low tier systems are compatible with each other such that a single transceiver (subscriber unit) can be utilized. Therefore, the present invention provides a dual mode system wherein the traffic channel protocols for each system operate on the same frame structure so that a single subscriber can be provided to operate at either mode.

In Table 1 below, the specifications for the traffic channels for the low tier (pedestrian) and high tier (mobile) systems are provided.

In the low tier (pedestrian) communication system, a traffic channel protocol using a 32 kbps (kilobits per second) ADPCM (Adaptive Delta Pulse Code Modulated) speech coder is utilized to provide toll quality calls. No error correction or equalization is required in the low tier system. In the high tier system, a 16 bit LD-CELP (Low Delay - Code Excited Linear Predictive) speech coder is used with a rate ½ forward error correction (FEC). However, a 32 kbps ADPCM using two slots per frame or an 8 kbps coder using one slot in every other frame would also provide acceptable high tier coding alternatives. If a 32 kbps ADPCM coder is used for both tiers, then two slots in the high tier would be required to transmit the 32 kb (kilobits) when the ½ rate FEC is used. This effectively reduces the number of channels from ten to five, but reduces the price and complexity of the unit by only requiring one type of coder.

Figure 2:
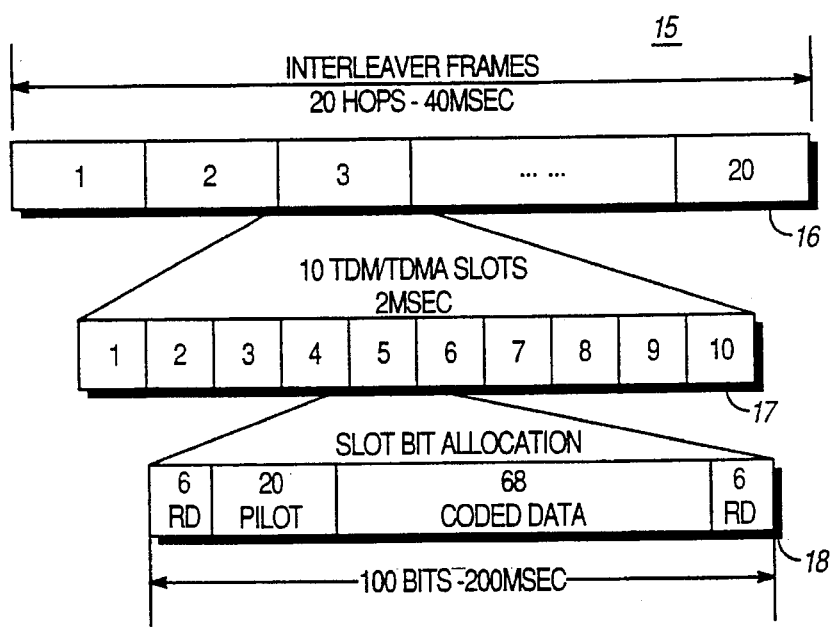
FIG. 2 is a frame structure for a low tier communication system embodying the present invention.

As can be seen from TABLE 1, and as illustrated in FIG. 2, the frame, generally designated 15, for the high tier system is a 20 hop interleaver frame 16. Each hop consists of a 10 slot TDMA (Time Division Multiple Access) frame 17. Each TDMA slot consists of 100 bits which consists of 6 ramp up bits, 20 pilot bits, 68 coded data bits (speech bits), and 6 ramp down bits. The 68 speech bits consist of interleaved speech, FED, and signalling bits. Each slot is 200 µsec (microseconds) long. This results in a TDMA frame being 2 msec (milliseconds) and the interleaver frame being 40 msec. Since this protocol utilizes both slow frequency hopping code division multiple access (CDMA) (i.e. the hopping sequence) combined with a time division multiple access method (TDMA) (multiple slot configuration) this protocol could best be characterized as a combination CDMA/TDMA method.

Figure 3:
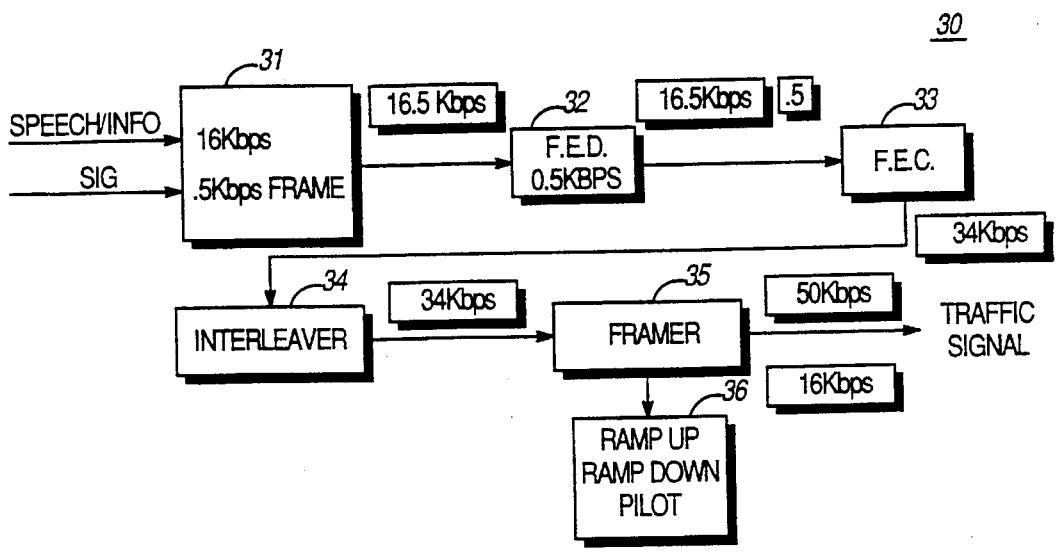
FIG. 3 is a block diagram illustrating the operation of a high tier modem embodying the present invention.

A block diagram of the operation of a high tier modem, generally designated 30, is illustrated in FIG. 3. A speech/information signal is received at one input of a framing device 31 and a signalling signal is received at a second input. In the preferred embodiment the speech is received at 16 kbps and the signalling at 0.5 kbps. The output from framing device 31 is a 16.5 kbps signal. This frame is input to a forward error detection (FED) device 32 which adds an additional 0.5 kbps signal onto the 16.5 kbps signal from framer 31. The output from FED 32 is input to a forward error correction (FEC) device 33. This takes the 17 kbps input and codes it to provide a 34 kbps output signal. The 34 kbps signal is then interleaved in interleaver 34. The ramp up, pilot, and ramp down bits (16 kbps), block 36, are then

TABLE 1

| DUAL MODE TRAFFIC CHANNEL PROTOCOLS | | |
|---|---|---|
| SPECIFICATION | LOW TIER | HIGH TIER |
| SPEECH CODER | 32 kbps ADPCM | 16 kbps LD-CELP |
| Forward Error Cor. | NONE | RATE 1/2 |
| BIT RATE | 500 kbps | 500 kbps |
| CHANNEL SPACING | 400 KHz | 400 KHz |
| ACCESS METHOD | TDM/TDMA 10 SLOTS | SFH-CDMA 10 SLOTS |
| FRAME DURATION | 2 ms | 2 ms |
| TRAFFIC CHANNELS | 750 | 750 |
| MODULATION | QPSK | QPSK |
| CONTROL CHANNEL | YES, DEDICATED SLOT | YES, DEDICATED SLOT |
| DUPLEX METHOD | FREQUENCY DIVISION | FREQUENCY DIVISION |
| HAND-OFF CAPABILITY | YES | YES |
| DIVERSITY | SWITCHED ANTENNA | MAX RATIO COMBINING |
| FREQUENCY HOPPING | NO | YES |
| TX POWER (AVG) | 10 mW | 100 mW | added, in framer block 35, to the signal frame which provides the 50 kbps traffic channel output. This compares with the 100 bit slots provided in FIG. 2 since the frames in FIG. 2 are 2 ms each or 500 frames per second. With each frame being 100 bits, the rate calculates out to the same 50 kbps figure. Likewise, the 32 bits per frame provided for ramping and pilot bits would be 16 kbps for 500 frames per second.

Figure 4:
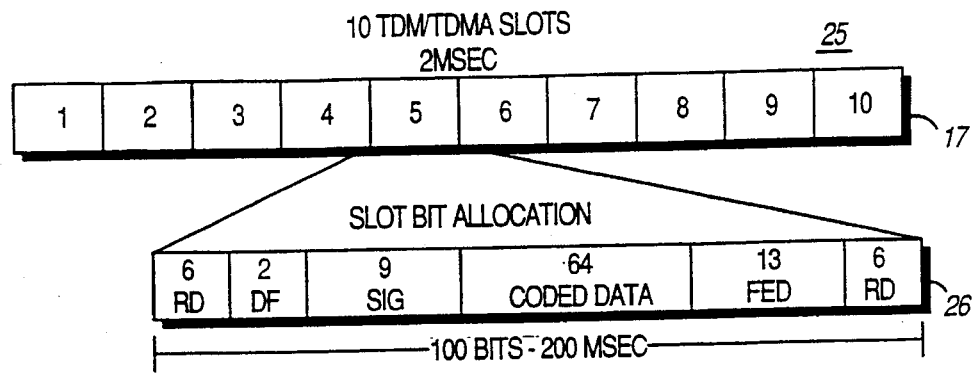
FIG. 4 is a frame structure for a high tier communication system embodying the present invention.

Referring now to FIG. 4, a low tier frame, generally designated 25, is illustrated. Since the low tier system is not hopped, there is no interleaving frame set. Therefore, the highest order frame in the low tier system is TDMA frame 17, having 10 slots. As in the high tier system, each slot contains 100 bits which consists of the 6 ramp up bits, 2 differential bits, 9 signalling bits, 64 speech bits, 13 FED bits, and 6 ramp down bits. Also, as with the high tier system, each slot has a duration of 200 μsec, making each TDMA frame 2 msec. While the transmission from the subscriber is a TDMA protocol, the transmissions from the base site may be either TDMA, where only the needed slots are used, or time division multiplexed (TDM) where all of the slots are filled whether being actively used or not. Therefore, the low tier system could be characterized as having either a TDMA or a TDM/TDMA protocol.

Figure 5:
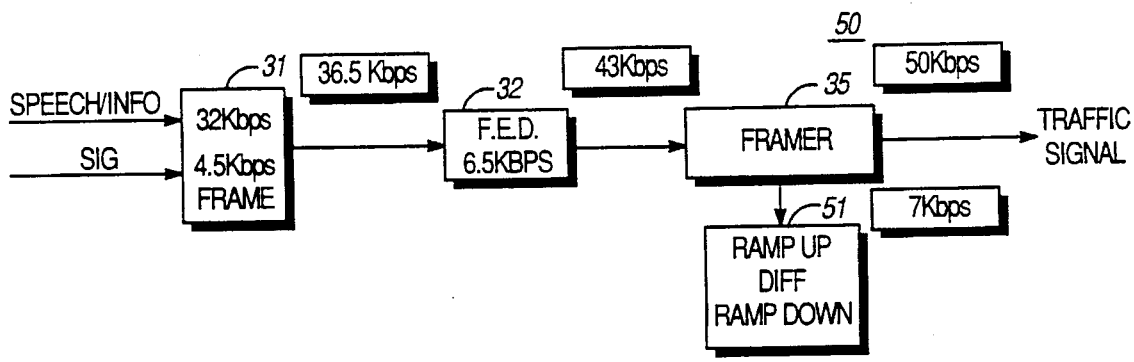
FIG. 5 is a block diagram illustrating the operation of a low tier modem embodying the present invention.

In FIG. 5, a block diagram of the operation of a low tier modem, generally designated 50, is illustrated. The low tier modem uses many of the same functions as the high tier modem, which may or may not operate in the same fashion. In FIG. 5, framing device 31 receives the speech signal at 32 kbps and the signalling information at 4.5 kbps. These are combined in framer 31 to form a 36.5 kbps signal. The 36.5 kbps signal is provided to FED 32 which adds 6.5 kbps for error detection. The resulting 43 kbps is added, in framer block 35, to a 7 kbps signal consisting of ramp up, differential, and ramp down bits, block 51. This results in a 50 kbps traffic signal.

As can be seen in a comparison of FIGS. 2 and 4, the low tier TDMA frame set matches the TDMA portion of the CDMA/TDMA frame set utilized by the high tier. By utilizing the same frame sets in both the high and low tier systems, a single transceiver can be designed to operate in both tiers which utilizes many of the same components, making a smaller, less expensive communication unit possible.

Figure 6:
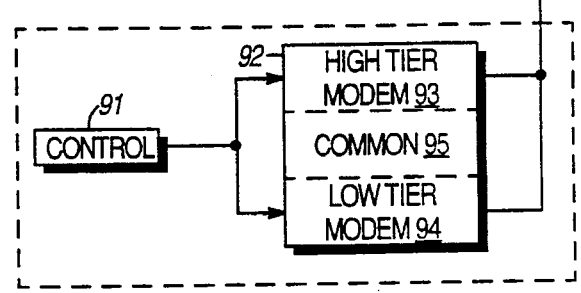
FIG. 6 is a block diagram of a modem embodying the present invention.

In FIG. 6, a general block diagram of a modem, generally designated 90, which will operate in either high tier or low tier is illustrated. Modem 90 consists of a high tier portion 93, a low tier portion 94, and a common portion 85 of components which are used in both the high and low tiers. The operation of modem 90 is controlled by a control device 91.

Control device 91 may operate based upon one or more parameters to select whether modem 90 operates in high or low tier. In one example, control device 91 may be a simple manual switch which the user controls to set modem 90 into either high tier or low tier operation. Alternatively, control device 91 may base the selection on availability of the low tier. For example, if the user is not within an area having low tier coverage (e.g. a sparsely populated area), control 91 would have to select the high tier to obtain service.

Another control parameter would be the bit error rate (BER) or word error rate (WER). If the BER or WER were excessive, control 91 would select the high tier. In another example, the user may start in the low tier mode and be transitioned, or handed-off, to the high tier mode when the users speed increased to a level where the BER or WER was unacceptable. Measuring the carrier-to-interference (C/I) ratio would have the same effect.

Figure 7:
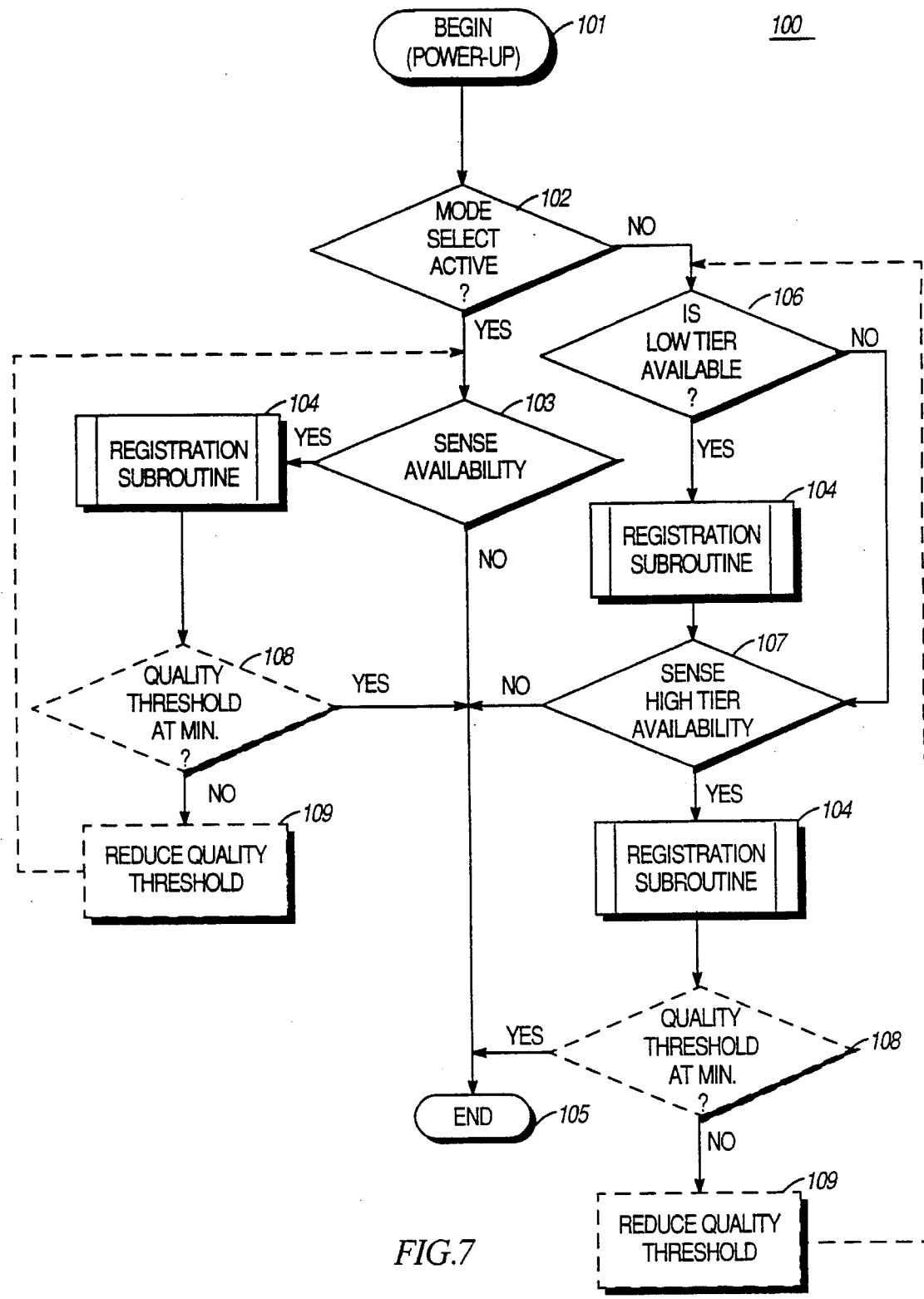
FIGS. 7 & 8 illustrate a block diagram of a flow chart of a method of registering a call in a dual mode communication network.
Figure 8:
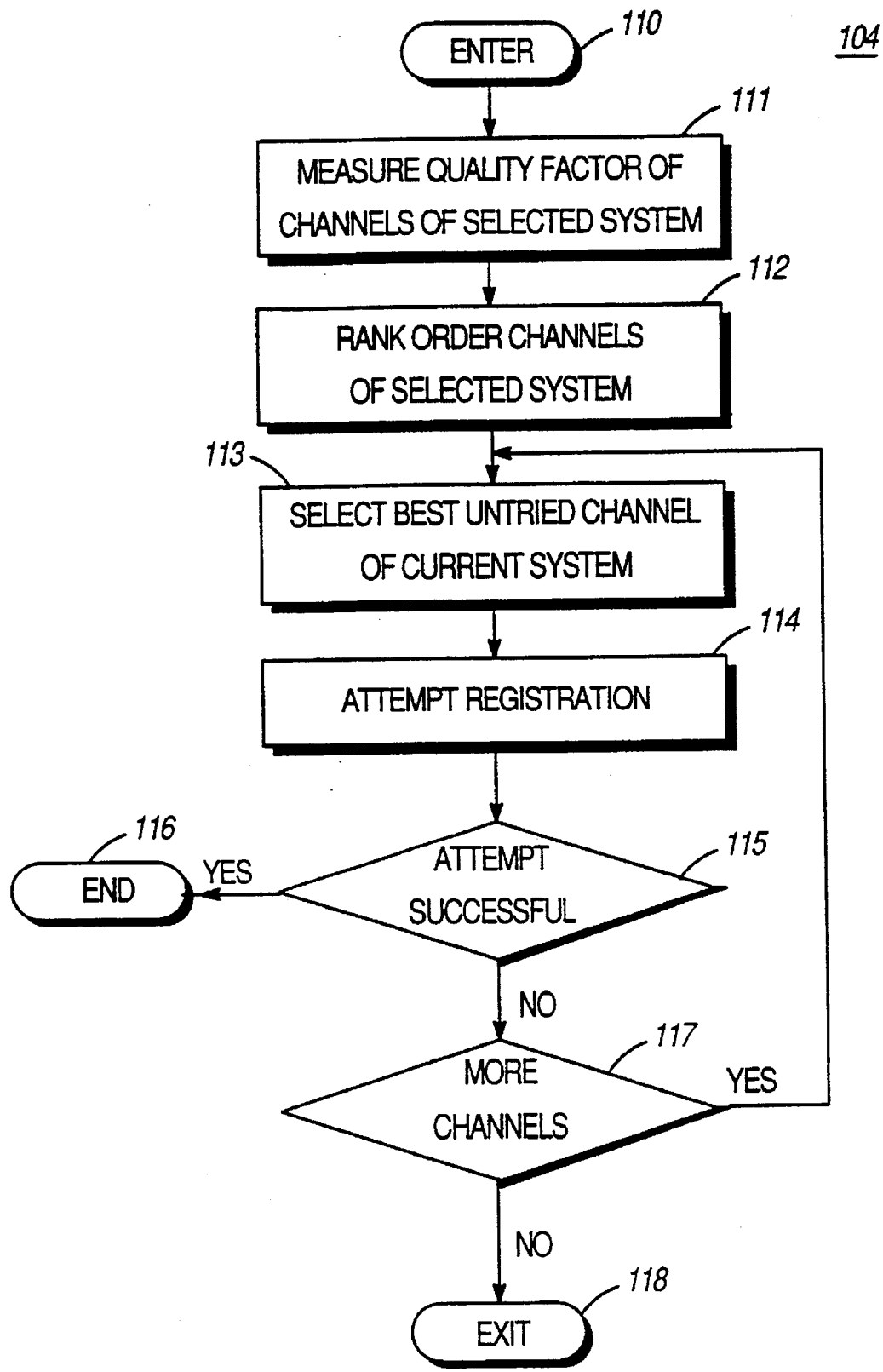

Referring now to FIGS. 7 and 8, a flow diagram of a process, generally designated 100, embodying the present invention is illustrated. Process 100 illustrates the method used to access a network. Process 100 begins at power-up of the subscriber, step 101. The subscriber may be provided with a manual override switch to place the unit in a mode where either the low tier or high tier system is specified. If this mode is active, decision step 102, the process 100 senses whether the selected tier is available, decisions step 103. If the selected system is available, registration is attempted using registration subroutine 104 which is described in more detail in FIG. 8. If the selected system is not available or if the registration in subroutine 104 fails, process 100 ends, step 105.

If the mode select switch is not active, decision step 102, then the subscriber unit will first attempt to connect with the low tier system. To accomplish this, it is first determined if the low tier system is available, decision step 106. If the low tier is available, registration is attempted using subroutine 104. If the low tier system is not available or if for some reason registration on the low tier system failed, process 100 then senses the availability of the high tier system, decision step 107. If the high tier system is available, registration is attempted using subroutine 104. If the high tier system is not available or if registration failed, then the call is not completed and process 100 ends, step 105.

Subprocess 104, illustrated in the flow chart of FIG. 8, is entered from one of the various avenues illustrated in FIG. 7 at step 102. Subprocess 104 then measures a quality factor of each channel available for the identified system, step 111. The quality factor may be any of a Received Signal Strength Indicator (RSSI), a Bit Error Rate (BER), a Word Error Rate (WER), a carrier-to-interference (C/I) factor, or an InterSymbol Interference (ISI) factor.

Once the quality measurements are made, the channels are ranked in order of quality by system, step 112. The subscriber then selects the best, untried channel of the system, step 113, and attempts to register the call on that channel, step 114. If the registration is successful, decision step 115, subprocess 104 ends, step 116.

However, while the signal transmitted from the base to the subscriber may appear to be a good quality signal to the subscriber, this does not mean that the signal from the subscriber to the base has the same quality. Therefore, the base may deny registration to the subscriber on that particular channel. If this occurs, process 100 continues to decision step 117 where it is determined if there are any more untried, qualified channels available in the system. If there are, subprocess 104 returns to step 113 and repeats from there.

If the registration fails, decision step 115, and there are no more qualified channels in the low tier, decision step 117, then subprocess 104 exits and returns to process 100, step 118.

As an option to process 100, a method of reducing the quality threshold level(s) can be implemented and the process repeated in an attempt to complete the call at a somewhat reduced quality. This is illustrated in FIG. 7 by the dashed blocks. If the registration attempt at the current threshold level fails, process 100 can determine if the quality threshold level is set to a minimum allowable, decision step 108. If it is at a minimum, process 100 will end, step 105, as before. If the threshold is not at a minimum, the quality threshold is reduced, step 109, and process 100 loops back to either decision step 103 or decision step 106. Process 100 will then attempt to complete the call at the reduced quality level.

The above method provides for call connection, or registration. Another aspect of the present invention is to provide for the transfer of a call between tiers during a call. For example, if the user is in the low tier and starts moving too fast, the call can be transferred to the high tier. Conversely, if the user is in the high tier and slows down, then the call could be transferred to the low tier. Another example is where a user is in the low tier, but, because of overload, the quality of the signal has degraded below some acceptable level. The network, or subscriber on its own initiative, could transfer the call to the high tier.

Figure 9:
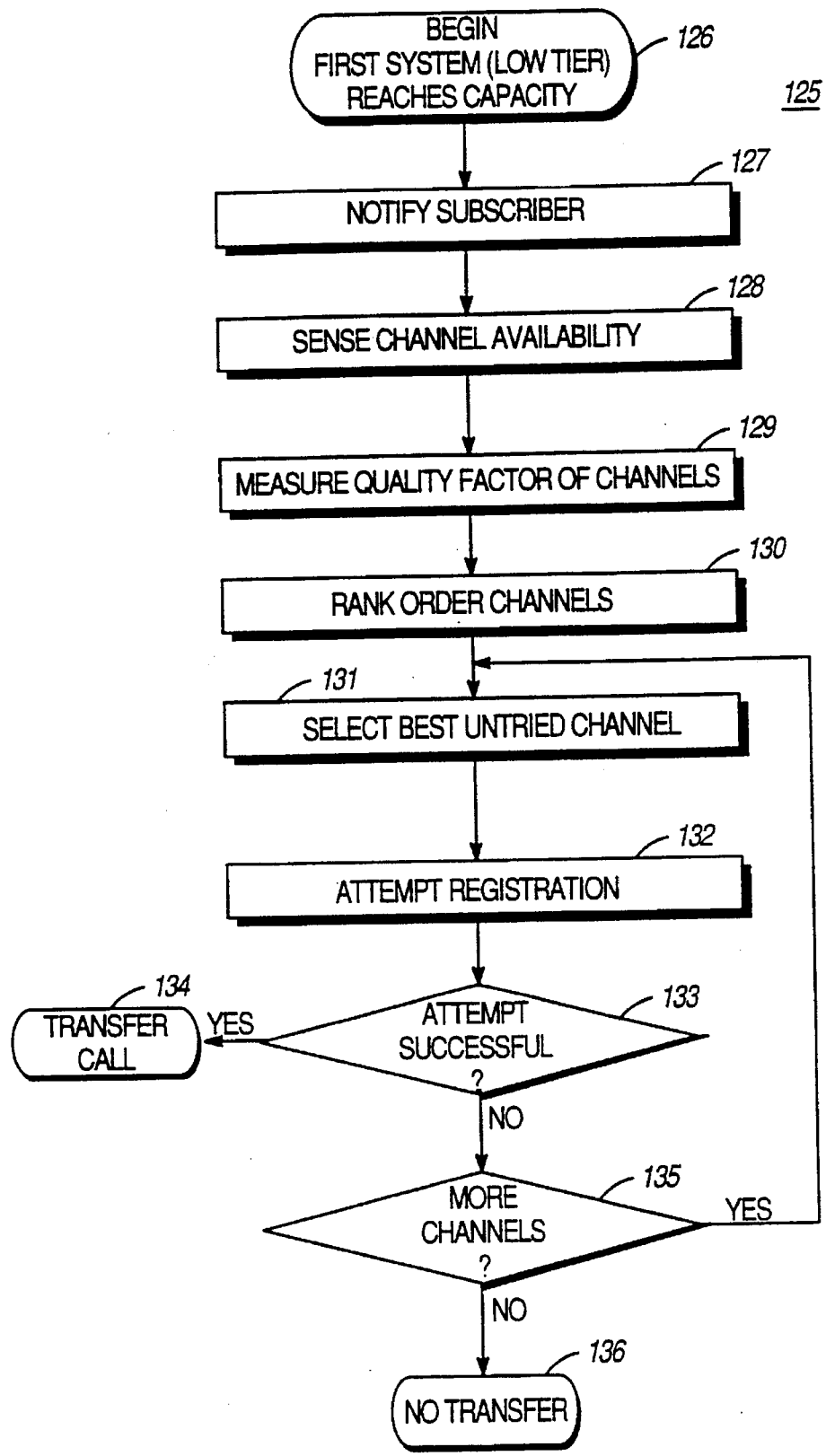
FIG. 9 illustrates a block diagram of a flow chart of a method of reassigning a call in a dual mode communication network.

An example of a process, generally designated 125, of transferring between tiers in a dual mode system is provided in FIG. 9. Process 125 begins at step 126 when the first system, the low tier system in this example, reaches capacity. The decision that capacity has been reached would typically be made by a system controller and would be based on one or more capacity, quality, or mobility factors. The capacity factors include items such as the amount of time the system has been at full capacity (e.g. all channels being used) and the blocked call rate. The quality factors include RSSI, BER, WER, C/I, and ISI, as described above in conjunction with process 100. The mobility factors would be such things as having the same channel available over an extended period (indicating non-movement of the subscriber) and various Doppler effects (e.g. frequency offset).

Once the first system determines it has reached capacity, it will look for subscribers to transfer to the other tier. The system will notify a subscriber unit, step 127, that the system is at capacity and a hand-off to the other tier is to be attempted. The subscriber unit will then sense the availability of the other tier, step 128, and, if present, make quality measurements of the available channels, step 129.

The available channels are then ranked according to their quality factors, step 130, and the best, untried channel is selected from the list, step 131. Step 131 may be conducted by either the subscriber or the base site (after having the measurements transmitted thereto by the subscriber). The subscriber will then attempt to register with the high tier system, step 132. If registration is successful, decision step 133, the call is transferred and process 125 ends, step 134.

If the attempted registration fails, decision step 133, then process 125 determines, in decision step 135, if there are more channels available. If more channels are available, process 125 loops back to step 131 and repeats If there are no more channels available, then the transfer fails, step 136. Note that since the transfer has failed, the call remains on the low tier system. The call is not otherwise effected.

Thus, it will be apparent to one skilled in the art that there has been provided in accordance with the invention, a method of registering/reassigning a call in a dual mode communication system that fully satisfies the objects, aims, and advantages set forth above.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

We claim:

1. A method of registering a call in a dual mode communication network having a first communication system providing communication services in a first mode according to a first air interface protocol and a second communication system providing communication services in a second mode according to a second air interface protocol, said method comprising the steps of:

(a) sensing the availability of said first communication system at power-up of a subscriber unit;

(b) measuring a first quality factor of a plurality of channels of said first communication system;

(c) ranking said plurality of channels within said first communication system by said first quality factors;

(d) selecting a channel of said first communication system if said first quality factor of said channel exceeds a quality threshold, set to a first threshold level, of said first communication system;

(e) attempting to register said call with said first communication system on said channel;

(f) repeating said steps (d) and (e), if said attempted registration in said step (e) fails, until registration has been attempted on each of said plurality of channels of said first communication system for which said first quality factor exceeds said quality threshold and determining whether said call is registered with said first communication system;

(g) sensing the availability of said second communication system if said attempted registration of said call with said first communication system fails;

(h) measuring a second quality factor of a plurality of channels of said second communication system;

(i) ranking said plurality of channels within said second communication system by said second quality factors;

(j) selecting a channel of said second communication system if said second quality factor of said channel exceeds a quality threshold, set to a second threshold level, of said second communication system;

(k) attempting to register said call with said second communication system on said channel;

(l) repeating said steps (j) and (k), if said attempted registration in said step (k) fails, until registration has been attempted on each of said plurality of channels of said second communication system for which said second quality factor exceeds said quality threshold;

(m) setting said quality threshold of said first communication system to a third threshold level;

(n) setting said quality threshold of said second communication system to a fourth threshold level; and (o) repeating said steps (a)–(l).

2. The method of claim 1 wherein each of said first and second quality factors comprise one of a received signal strength indicator (RSSI), a bit error rate (BER), a word error rate (WER), a carrier-to-interference ratio (C/I), and an intersymbol interference (ISI) rate.

3. The method of claim 1, wherein said first communication system comprises a low tier system and said second communication system comprises a high tier system.

4. The method of claim 1, wherein said first communication system comprises a wireless communication system.

5. The method of claim 1, wherein said second communication system comprises a cellular system.

6. The method of claim 1, wherein one of said first and second quality factors comprises a mobility factor.

7. The method of claim 6, wherein said mobility factor comprises one of a frequency offset factor and a channel availability indicator.

8. A method of registering a call in a dual mode communication network comprising the steps of:

receiving a first signal transmitted over a first channel of a first communication system via a first air interface protocol;

measuring a first quality factor of the first signal;

selecting a channel of said first communication system if said first quality factor exceeds a first quality threshold having a first threshold level;

attempting to register said call with said first communication system on said first channel;

determining whether said call is registered with said first communication system;

receiving a second signal transmitted via a second air interface protocol over a second channel of said second communication system;

measuring a second quality factor of said second signal;

selecting a channel of said second communication system if said second quality factor of said channel exceeds a second quality threshold having a second threshold level;

attempting to register said call with said second communication system on said second channel;

setting one of said first and second quality thresholds to a third threshold level; and re-attempting to register said call with one of said first and second communication system if one of said first and second quality factors exceeds said third threshold level.

9. The method of claim 8, wherein said first communication system comprises a low tier system and said second communication system comprises a high tier system.

10. The method of claim 8, wherein said first communication system comprises a wireless communication system.

11. The method of claim 8, wherein said second communication system comprises a cellular system.

12. The method of claim 8, wherein one of said first and second quality factors comprises a mobility factor.

13. The method of claim 12, wherein said mobility factor comprises one of a frequency offset factor and a channel availability indicator.

14. The method of claim 8, wherein one of said first and second quality factors is selected from the group consisting essentially of a received signal strength indicator, a bit error rate, a word error rate, a carrier-to-interference ratio, and an intersymbol interference rate.

15. The method of claim 8, wherein said first air interface protocol supports a first traffic channel having a low tier framing structure.

16. The method of claim 15, wherein said second air interface protocol supports a second traffic channel having a high tier framing structure.

17. The method of claim 16, wherein at least a portion of said low tier framing structure substantially matches at least a portion of said high tier framing structure.

* * * * *